(12) United States Patent
Hara (10) Patent No.: US 9,739,603 B2
(45) Date of Patent: *Aug. 22, 2017

(54) CALIBRATION DEVICE, CALIBRATION METHOD, AND NON-TRANSITORY COMPUTER-READABLE RECORDING MEDIUM

(71) Applicant: RICOH COMPANY, LTD., Tokyo (JP)

(72) Inventor: Takayuki Hara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 415 days.

This patent is subject to a terminal disclaimer.

(21) Appl. No.: 14/208,669

(22) Filed: Mar. 13, 2014

(65) Prior Publication Data

US 2014/0267624 A1    Sep. 18, 2014

(30) Foreign Application Priority Data

Mar. 15, 2013    (JP) .................................. 2013-053551

(51) Int. Cl.
*H04N 13/02* (2006.01)
*G01B 11/25* (2006.01)

(52) U.S. Cl.
CPC ................. *G01B 11/2504* (2013.01)

(58) Field of Classification Search
None
See application file for complete search history.

(56) References Cited

U.S. PATENT DOCUMENTS

| 5,991,437 A | * | 11/1999 | Migdal ............... G01B 11/2504 |
| | | | 348/139 |
| 6,044,170 A | * | 3/2000 | Migdal ............... G01B 11/2518 |
| | | | 250/559.23 |
| 7,724,379 B2 | | 5/2010 | Kawasaki et al. |

(Continued)

FOREIGN PATENT DOCUMENTS

| JP | 2001-320652 | 11/2001 |
| JP | 2005-326247 | 11/2005 |

(Continued)

*Primary Examiner* — Dakshesh Parikh
(74) *Attorney, Agent, or Firm* — Oblon, McClelland, Maier & Neustadt, L.L.P.

(57) ABSTRACT

A calibration device includes a part for controlling a projection device to project a pattern onto a three-dimensional object having characteristic points, a part for controlling an imaging device to acquire images wherein the three-dimensional object with the pattern projected thereon is imaged from imaging directions, a part for estimating a relative position and attitude of the imaging device with respect to the three-dimensional object based on positions of the characteristic points of the three-dimensional object on the images, a part for estimating reflection positions of projection light rays corresponding to characteristic points of the pattern on the three-dimensional object based on positions of the characteristic points of the pattern and the relative position and attitude of the imaging device, for each image, and a part for identifying positions and directions of the projection light rays corresponding to the characteristic points of the pattern based on the reflection positions.

12 Claims, 7 Drawing Sheets

(56) References Cited

U.S. PATENT DOCUMENTS

| | | |
|---|---|---|
| 2011/0164114 A1 | 7/2011 | Kobayashi et al. |
| 2012/0033071 A1 | 2/2012 | Kobayashi et al. |
| 2013/0010070 A1* | 1/2013 | Tateno ................ G01B 11/002 348/46 |

FOREIGN PATENT DOCUMENTS

| | | |
|---|---|---|
| JP | 2008-165202 | 7/2008 |
| JP | 2008-249432 | 10/2008 |
| JP | 4230525 | 2/2009 |
| JP | 2011-141174 | 7/2011 |
| JP | 2012-037391 | 2/2012 |
| JP | 2012-078858 | 4/2012 |
| WO | WO 2008/120457 A1 | 10/2008 |

* cited by examiner

FIG.2A

PINHOLE OPTICAL SYSTEM

FIG.2B

NON-PINHOLE OPTICAL SYSTEM

| 1 | 2 | 1 |
|---|---|---|
| 2 | 4 | 2 |
| 1 | 2 | 1 |

FIG.9

CALIBRATION DEVICE, CALIBRATION METHOD, AND NON-TRANSITORY COMPUTER-READABLE RECORDING MEDIUM

BACKGROUND OF THE INVENTION

1. Field of the Invention

An aspect of the present invention relates to at least one of a calibration device, a calibration method, and a non-transitory computer-readable recording medium.

2. Description of the Related Art

Conventionally, a three-dimensional measurement technique based on a stereo method has been applied in a wide field. Herein, there are mainly a passive measurement method and an active measurement method for a three-dimensional measurement method based on a stereo method.

In an active measurement method, while a particular pattern image is projected onto a measurement target, the measurement target is imaged from a viewpoint different from a projection viewpoint and a correspondence between a projected pattern image and a pattern image on an imaged measurement target is made. Then, a distance to the measurement target is calculated by a principle of triangulation based on a position of a picture element at a corresponding point of each image, an internal parameter (such as a focal length, a position of an optical axis, or a lens distortion) of an optical system of each of a projection device and an imaging device, and an external parameter thereof (a relative position or an attitude of the projection device and the imaging device) (for example, Japanese Patent Application Publication No. 2011-141174).

Herein, preliminary acquisition of an internal parameter and an external parameter as described above prior to a three-dimensional measurement is referred to as a "calibration".

In a calibration in an active measurement method, after a pattern image projected on a projection surface for calibration is normally imaged by an imaging device, a correspondence of the pattern image is made among a screen for calibration, a projection surface of a projection device, and an imaging surface of an imaging device, and based on a result thereof, internal and external parameters are acquired (for example, Japanese Patent Application Publication No. 2001-320652).

A precondition of such a calibration method is that it is possible for an optical system of a projection device to be approximated by a pinhole camera model (a central projection method in such a manner that projection light rays pass through one particular point), but a commercially available projection device may have an optical system differing from the pinhole camera model.

For example, Japanese Patent Application Publication No. 2008-165202 discloses a short focus projector using a concave mirror that does not condense projection light rays at one point in order to reduce degradation of an optical performance thereof at a lower cost, but it is not possible to apply a conventional calibration method to a three-dimensional measurement device using such a projector.

SUMMARY OF THE INVENTION

According to one aspect of the present invention, there is provided a calibration device, including a pattern-for-calibration projection part configured to control a projection device to project a pattern for calibration onto a three-dimensional object for calibration that has a plurality of characteristic points, an object-for-calibration imaging part configured to control an imaging device to acquire a plurality of images wherein the three-dimensional object with the pattern for calibration projected thereon is imaged from a plurality of imaging directions, a position attitude estimation part configured to estimate a relative position and attitude of the imaging device with respect to the three-dimensional object based on positions of the characteristic points of the three-dimensional object on the plurality of images, a reflection position estimation part configured to estimate reflection positions of projection light rays corresponding to characteristic points of the pattern for calibration on the three-dimensional object based on positions of the characteristic points of the pattern for calibration and the relative position and attitude of the imaging device being estimated, for each image, and a projection light ray identification part configured to identify positions and directions of the projection light rays corresponding to the characteristic points of the pattern for calibration based on a plurality of the reflection positions estimated for the plurality of images.

According to another aspect of the present invention, there is provided a calibration method, including a step of controlling a projection device to project a pattern for calibration onto a three-dimensional object for calibration that has a plurality of characteristic points, a step of controlling an imaging device to acquire a plurality of images wherein the three-dimensional object with the pattern for calibration projected thereon is imaged from a plurality of imaging directions, a step of estimating a relative position and attitude of the imaging device with respect to the three-dimensional object based on positions of the characteristic points of the three-dimensional object on the plurality of images, a step of estimating reflection positions of projection light rays corresponding to characteristic points of the pattern for calibration on the three-dimensional object based on positions of the characteristic points of the pattern for calibration and the relative position and attitude of the imaging device being estimated, for each image, and a step of identifying positions and directions of the projection light rays corresponding to the characteristic points of the pattern for calibration based on a plurality of the reflection positions estimated for the plurality of images.

According to another aspect of the present invention, there is provided a non-transitory computer-readable recording medium storing a computer program configured to cause a computer to execute the calibration method as described above.

DETAILED DESCRIPTION OF THE PREFERRED EMBODIMENTS

Although an embodiment of the present invention will be described below, the present invention is not limited to the embodiment described below. Here, an identical reference numeral is used for a common element in each figure referred to below and a description thereof will be omitted appropriately.

Figure 1:
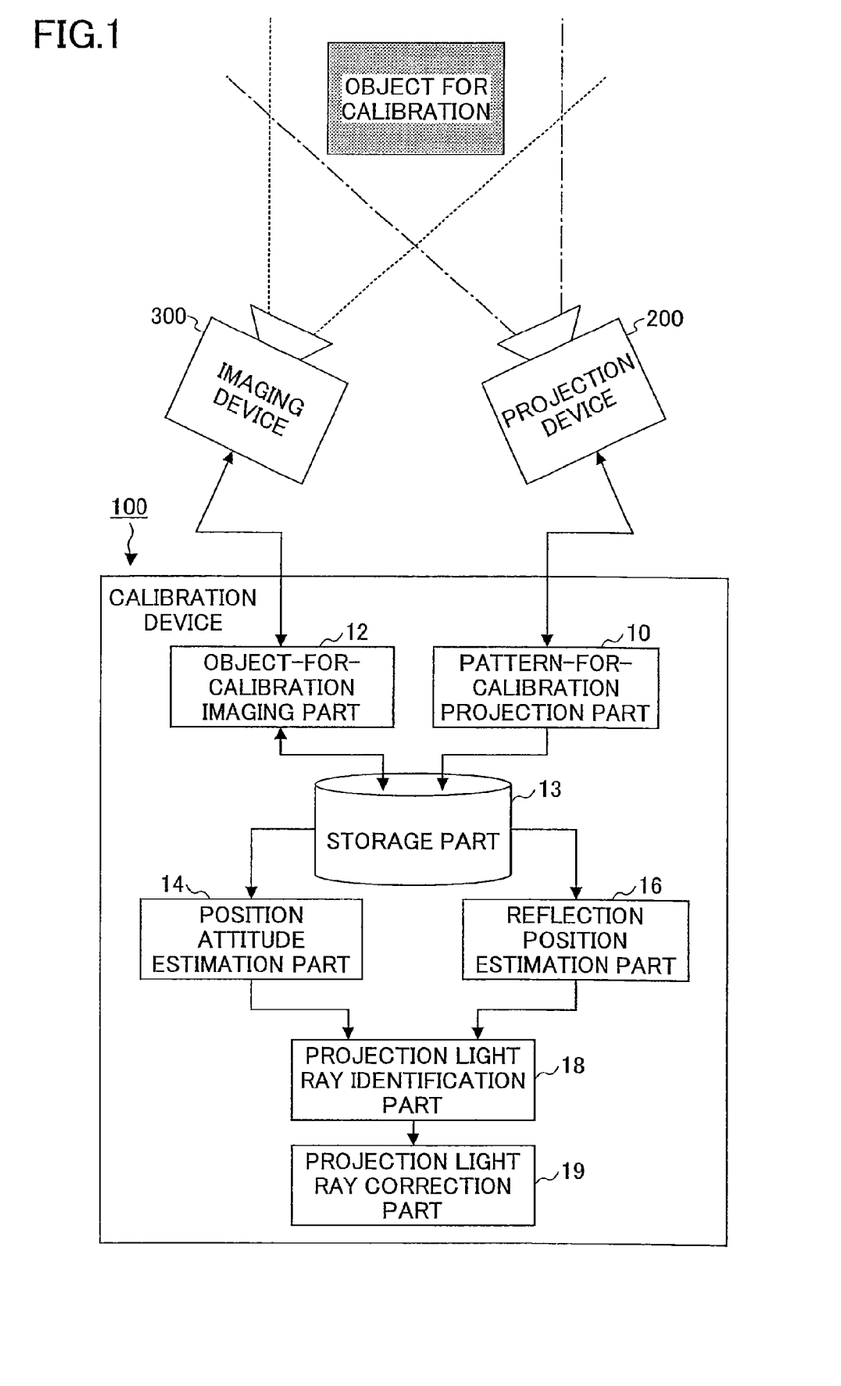
FIG. 1 is a functional block diagram of a calibration device in the present embodiment.

FIG. 1 illustrates a functional block diagram of a calibration device 100 that is an embodiment of the present invention. In FIG. 1, a projection device 200 and an imaging device 300 are optical devices that are used for a three-dimensional measurement (active measurement method) based on a stereo method.

Figure 2A:
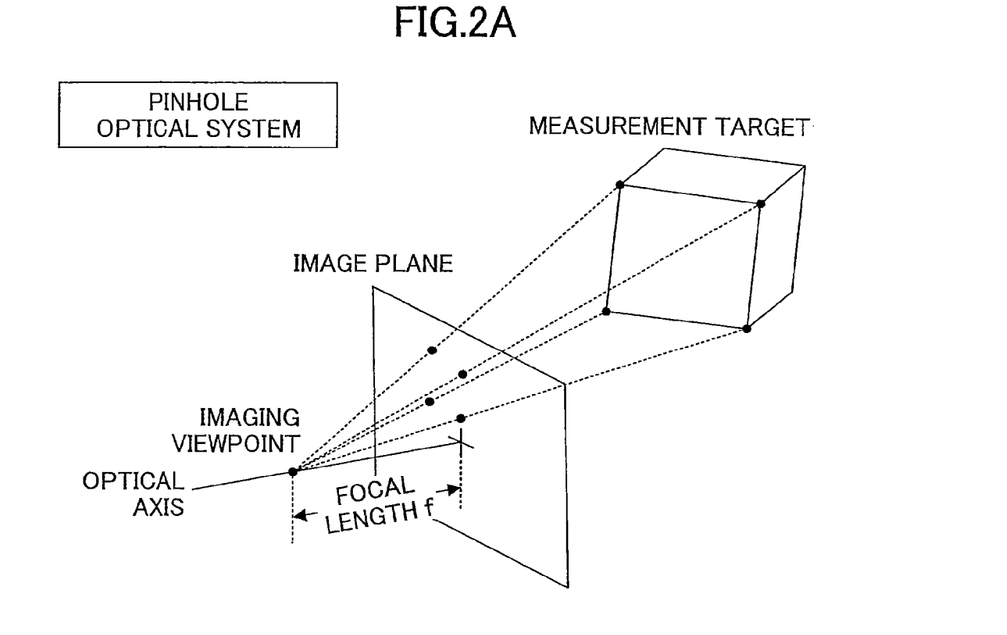
FIG. 2A and FIG. 2B are conceptual diagrams for illustrating an optical system differing from a pinhole camera model.

For the imaging device 300, it is possible to refer to a digital camera with an imaging element such as a CCD or a CMOS, and to have an optical system of a pinhole camera model wherein light rays pass through one imaging viewpoint (that will be referred to as a pinhole optical system, below) as illustrated in FIG. 2A.

Figure 2B:
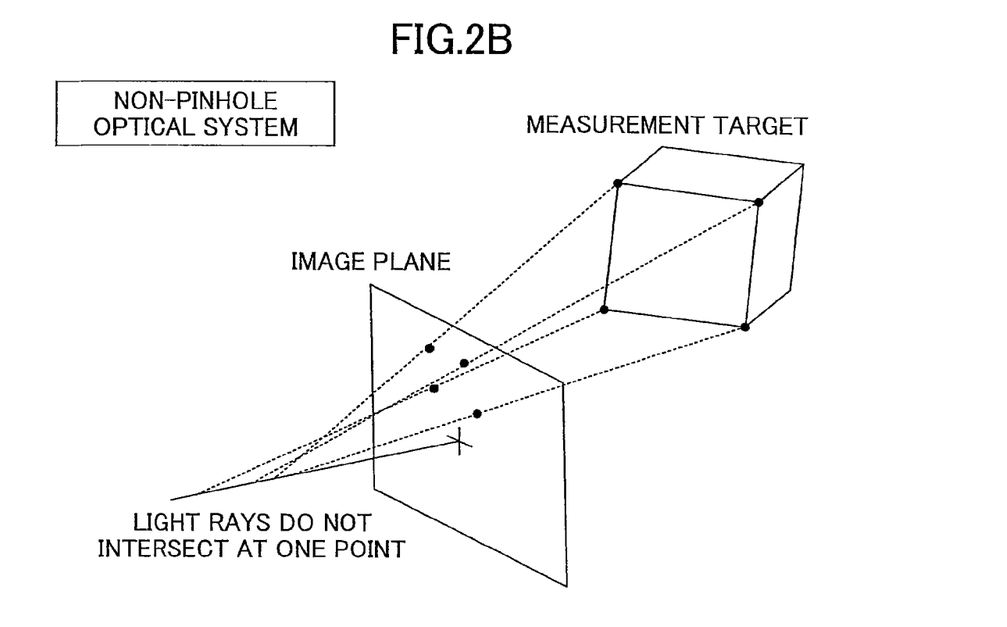

On the other hand, for the projection device 200, it is possible to refer to a short focus projector, and a configuration is adopted for reflecting from an aspheric reflection mirror and projecting onto a screen light that has transmitted through a short focus projection lens, in order to wide-project a picture onto a screen arranged adjacently. Accordingly, the projection device 200 has an optical system differing from a pinhole camera model wherein not all light rays intersect at one point (that will be referred to as a non-pinhole optical system, below), as illustrated in FIG. 2B.

In the present embodiment, a three-dimensional object for calibration (that will be referred to as an object for calibration, below) is prepared for calibration. Here, a position of an object for calibration in a three-dimensional coordinate system is measured preliminarily and known.

In the present embodiment, a pattern for calibration is projected from the projection device 200 onto an object for calibration and the imaging device 300 images the object for calibration with the pattern projected thereon, on a condition that a relative position and attitude of the projection device 200 and the imaging device 300 are fixed for calibration.

Herein, for the calibration device 100 in the present embodiment, it is possible to refer to an information processing device that is capable of communicating with and connected to both the projection device 200 and the imaging device 300, and a position and direction of a projection light ray projected from the projection device 200 that has a non-pinhole optical system (that is, an equation for representing a projection light ray) is identified.

As illustrated in FIG. 1, the calibration device 100 in the present embodiment is configured to include a pattern-for-calibration projection part 10, an object-for-calibration imaging part 12, a storage part 13, a position attitude estimation part 14, a reflection position estimation part 16, a projection light ray identification part 18, and a projection light ray correction part 19.

The pattern-for-calibration projection part 10 reads out a predetermined pattern for calibration from the storage part 13 and controls the projection device 200 in such a manner that the pattern for calibration is projected onto a three-dimensional object that is prepared for calibration (as described below).

The object-for-calibration imaging part 12 controls the imaging device 300 in such a manner that a three-dimensional object with a pattern for calibration projected thereon is imaged to acquire, and store in the storage part 13, an imaged image. Herein, in the present embodiment, a relative imaging direction of the imaging device 300 with respect to an object for calibration is changed M times (wherein M is an integer equal to or greater than 2), and the object-for-calibration imaging part 12 acquires, and stores in the storage part 13, M imaged images.

The position attitude estimation part 14 reads an imaged image acquired by the imaging device 300 from the storage part 13 and estimates a relative position and an attitude of the imaging device 300 with respect to an object for calibration.

The reflection position estimation part 16 estimates a reflection position of a pattern for calibration based on a relative position and an attitude of the imaging device 300 that are estimated by the position attitude estimation part 14.

The projection light ray identification part 18 identifies a position and a direction of a projection light ray projected from the projection device 200 that has a non-pinhole optical system, based on a reflection position of a pattern for calibration that is estimated by the reflection position estimation part 16.

The projection light ray correction part 19 corrects a position and a direction of a projection light ray that are identified by the projection light ray identification part 18.

Figure 3:
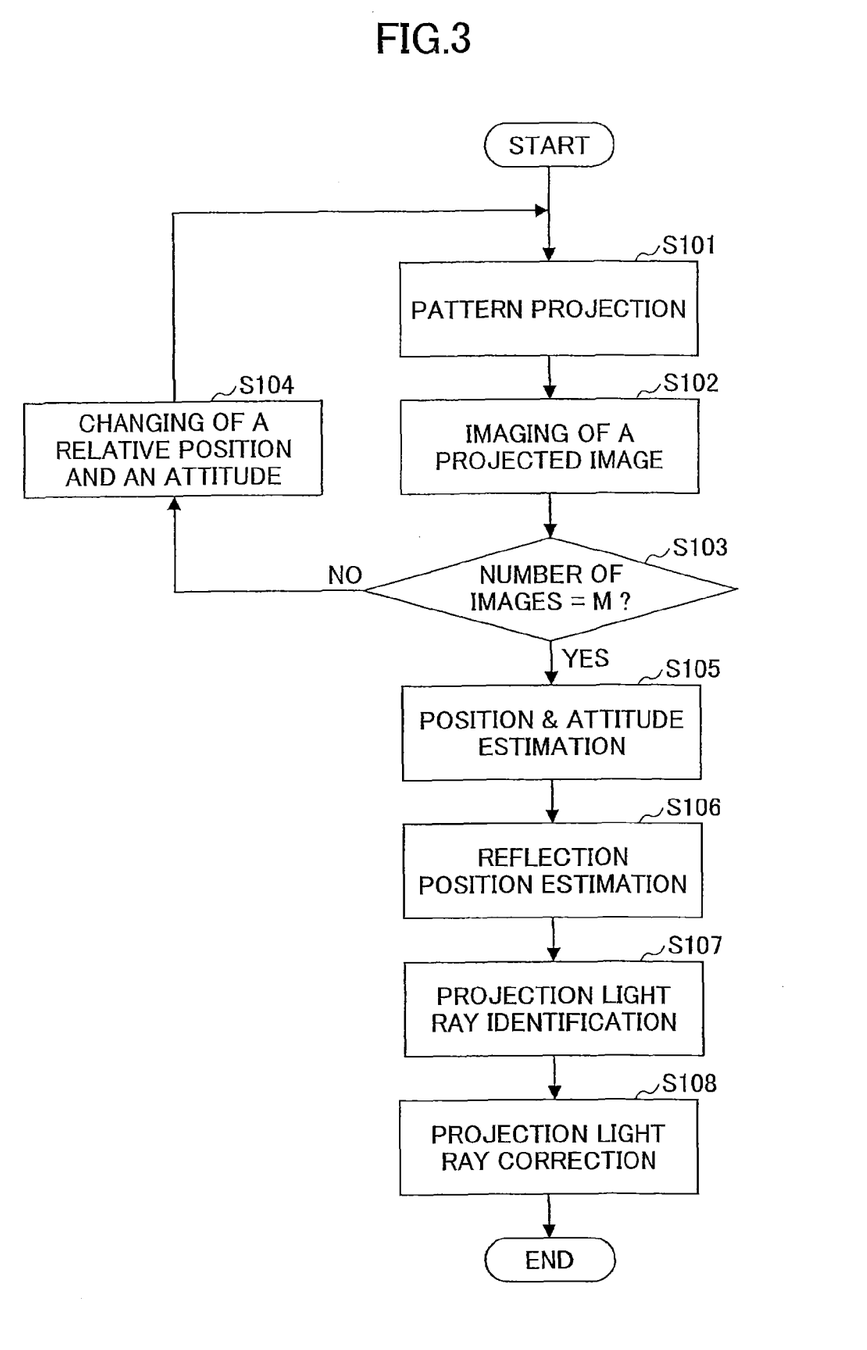
FIG. 3 is a flowchart for illustrating a process executed by a calibration device in the present embodiment.

Each functional part that composes the calibration device 100 in the present embodiment has been generally described above, and subsequently, a content of a process that is cooperatively executed by each functional part described above will be described based on a flowchart illustrated in FIG. 3. Here, reference to FIG. 1 will be provided appropriately in the following description.

At step 101, the projection device 200 reads out from the storage part 13, and projects onto a preliminarily prepared object for calibration, a pattern for calibration.

Figure 4:
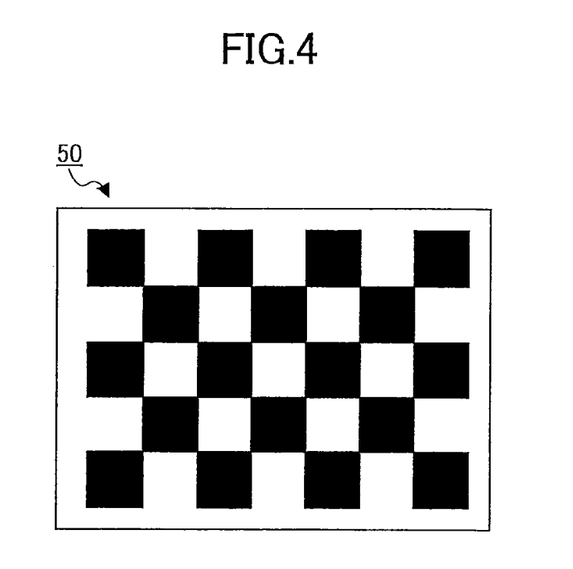
FIG. 4 is a diagram for illustrating a pattern for calibration in the present embodiment.

FIG. 4 illustrates a checker pattern as one example of a pattern for calibration used in the present embodiment. This will be referred to as a pattern for calibration 50 below.

Figure 5:
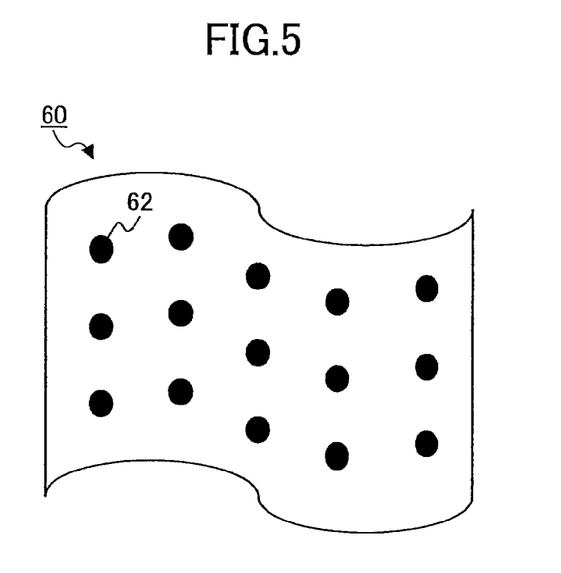
FIG. 5 is a diagram for illustrating an object for calibration in the present embodiment.

On the other hand, FIG. 5 illustrates one example of an object for calibration prepared in the present embodiment. A condition for an object for calibration in the present embodiment is that a surface thereof has N characteristic point(s). An object for calibration 60 illustrated in FIG. 5 is provided with a curved surface and a plurality of circular patterns 62 as characteristic points are drawn on the curved surface. Here, in the present embodiment, a shape of the object for calibration 60 and a position of each circular pattern 62 in a three-dimensional coordinate system are preliminarily measured by an appropriate method prior to calibration and known. Otherwise, in a case where a calibration object is created by a 3D printer, it is possible to know a position(s) of a characteristic point(s) in a three-dimensional coordinate system by using design values (CAD data) of the calibration object that are used for an input thereof.

The following steps will be described for a case where the pattern for calibration 50 illustrated in FIG. 4 and the object for calibration 60 illustrated in FIG. 5 are used as an example.

At a subsequent step 102, the object for calibration 60 with the pattern for calibration 50 projected thereon is imaged by the imaging device 300, and the image is stored in the storage part 13 (after correction of a lens distortion is applied to the imaged image according to need).

At a subsequent step 103, whether or not the number of images reaches M is determined. As a result, in a case where a determination is provided in such a manner that the number of images does not reach M (step 103, No), the process goes to step 104.

At step 104, a three-dimensional position of the object for calibration 60 is changed. Herein, a three-dimensional position of the object for calibration 60 may be changed manually or may be changed by fixedly mounting the object for calibration 60 on an appropriate driving stage and controlling the driving stage. In essence, at step 104, it is sufficient to change a relative position and/or an attitude of the object for calibration 60 with respect to the imaging device 300, or in another embodiment, such a relative position and/or an attitude of the object for calibration 60 with respect to the imaging device 300 may be changed by moving the imaging device 300 (and the projection device 200) on a condition that a three-dimensional position of the object for calibration 60 is fixed.

In the following, steps 101-104 are repeated until a determination is provided at step 103 in such a manner that the number of images reaches M, and at a time when the number of images reaches M (step 103, Yes), the process goes to step 105. At this time, M imaged images of the object for calibration 60 are stored in the storage part 13.

At step 105, the position attitude estimation part 14 estimates a relative position and/or an attitude of the imaging device 300 with respect to the object for calibration 60 in a camera coordinate system in accordance with the following procedure.

First, M imaged images stored in the storage part 13 (imaged images of the object for calibration 60) are read and positions of N characteristic points (centers of circular patterns 62) in a camera coordinate system are acquired from each imaged image.

Herein, a relative rotation and/or translation of the imaging device 300 is/are considered as being caused wherein a position of the i-th characteristic point in the j-th imaged image in a camera coordinate system is referred to as $(x_i^{(j)}, y_i^{(j)})$ and a position of the i-th characteristic point drawn on the object for calibration 60 in a three-dimensional coordinate system is referred to as $(X_i, Y_i, Z_i)$.

As a rotation matrix and a translation vector for the imaging device at a time when the J-th image is imaged are $R^{(j)}$ and $t^{(j)}$, an ideal imaging position $(x'^{(j)}_i, y'^{(j)}_i)$ of the i-th characteristic point $(X_i, Y_i, Z_i)$ drawn on the object for calibration 60 is calculated in accordance with the following formula (1):

$$\begin{pmatrix} x'^{(j)}_i \\ y'^{(j)}_i \\ 1 \end{pmatrix} \cong K[R^{(j)} \ t^{(j)}] \begin{pmatrix} X_i \\ Y_i \\ Z_i \\ 1 \end{pmatrix} \quad (1)$$

because the imaging device 300 has a pinhole optical system. In the aforementioned formula (1), "≅" indicates equal or includes a constant multiplication.

In the aforementioned formula (1), K is an internal parameter matrix for the imaging device 300 and is represented by the following formula (2):

$$K = \begin{pmatrix} f_x & 0 & c_x \\ 0 & f_y & c_y \\ 0 & 0 & 1 \end{pmatrix} \quad (2)$$

wherein a focal length $(f_x, f_y)$ and a position of an optical axis $(c_x, c_y)$ of the imaging device 300 are used. Here, an internal parameter K may be obtained preliminarily.

Herein, in the present embodiment, an evaluation function is provided by obtaining a sum of a square of a Euclidean distance between an ideal imaging position $(x'^{(j)}_i, y'^{(j)}_i)$ calculated in accordance with the aforementioned formula (1) and an imaging position $(x_i^{(j)}, y_i^{(j)})$ observed by the imaging device 300 practically, with respect to N characteristic point(s) and M imaged image(s), and K, $R^{(j)}$, and $t^{(j)}$ are obtained in such a manner that this is minimized.

As a result, a rotation matrix $R^{(j)T}$ and a translation vector $-R^{(j)T}t^{(j)}$ (wherein T indicates transposition) for the j-th imaged image of the object for calibration 60 are obtained and a relative position and/or attitude of the imaging device 300 with respect to the object for calibration 60 in a camera coordinate system is/are estimated.

At a subsequent step 106, the reflection position estimation part 16 estimates a projection position of a projection light ray corresponding to a characteristic point of the pattern for calibration 50 on the object for calibration 60, that is, a reflection position (a position in a three-dimensional coordinate system) of the projection light ray on the object for calibration 60, in accordance with the following procedure.

First, while M imaged images (imaged images of the object for calibration 60) are read from the storage part 13, corners of each of white and black square parts that compose the pattern for calibration 50 are detected from each imaged image as characteristic points, by using a Harris corner detection method or the like, so that positions of the characteristic points in a camera coordinate system are acquired.

Then, a reflection position of a projection light ray corresponding to a characteristic point of the pattern for calibration 50 on the object for calibration 60 is estimated from a position of a characteristic point of the pattern for calibration 50 in a camera coordinate system as acquired in accordance with the aforementioned procedure and a relative position and/or an attitude of the imaging device 300 with respect to the object for calibration 60 in a camera coordinate system as estimated at step 104.

Figure 6:
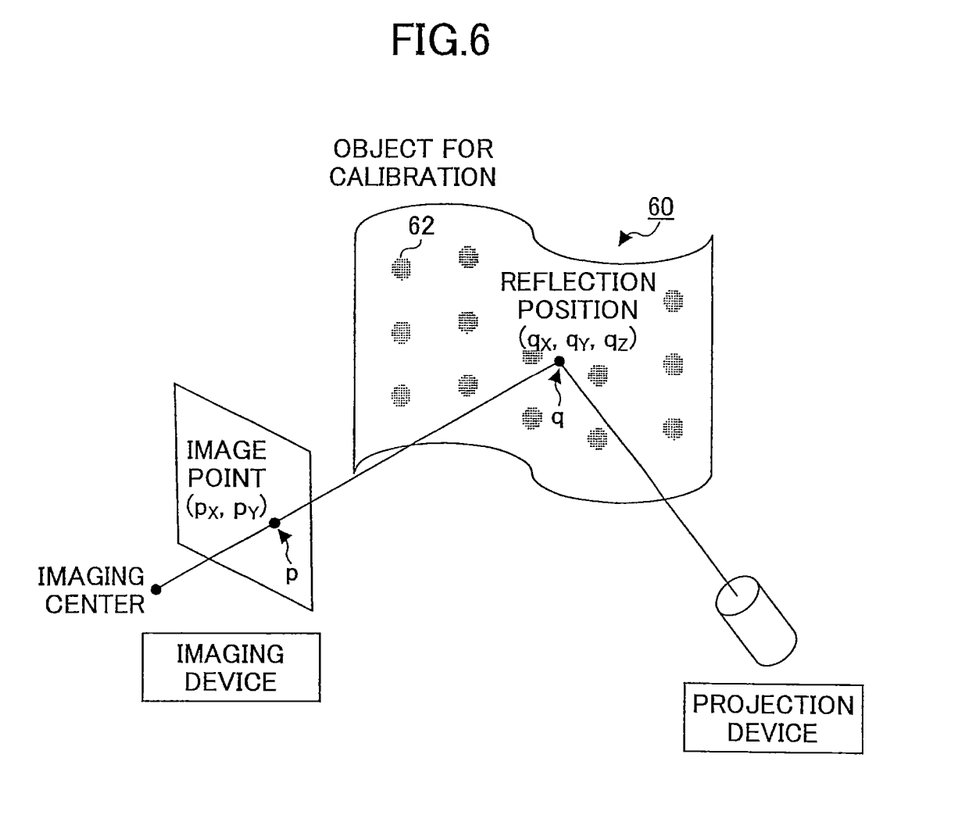
FIG. 6 is a conceptual diagram for illustrating a process executed by a reflection position estimation part in the present embodiment.

Specifically, as illustrated in FIG. 6, a position of a point where a straight line passing through an imaging center of the imaging device 300 and a position (px, py) of a characteristic point p of the pattern for calibration 50 in a camera coordinate system intersects a surface of the object for calibration 60 is estimated as a position $(qx, qy, qz)^T$ of a reflection position q of a projection light ray corresponding to the characteristic point p of the pattern for calibration 50 on the object for calibration 60 in a three-dimensional coordinate system.

After step 105 and step 106 described above are executed for all of M imaged images stored in the storage part 13, the process goes to step 107.

At step 107, the projection light ray identification part 18 identifies a position and a direction of a projection light ray in accordance with the following procedure.

Figure 7:
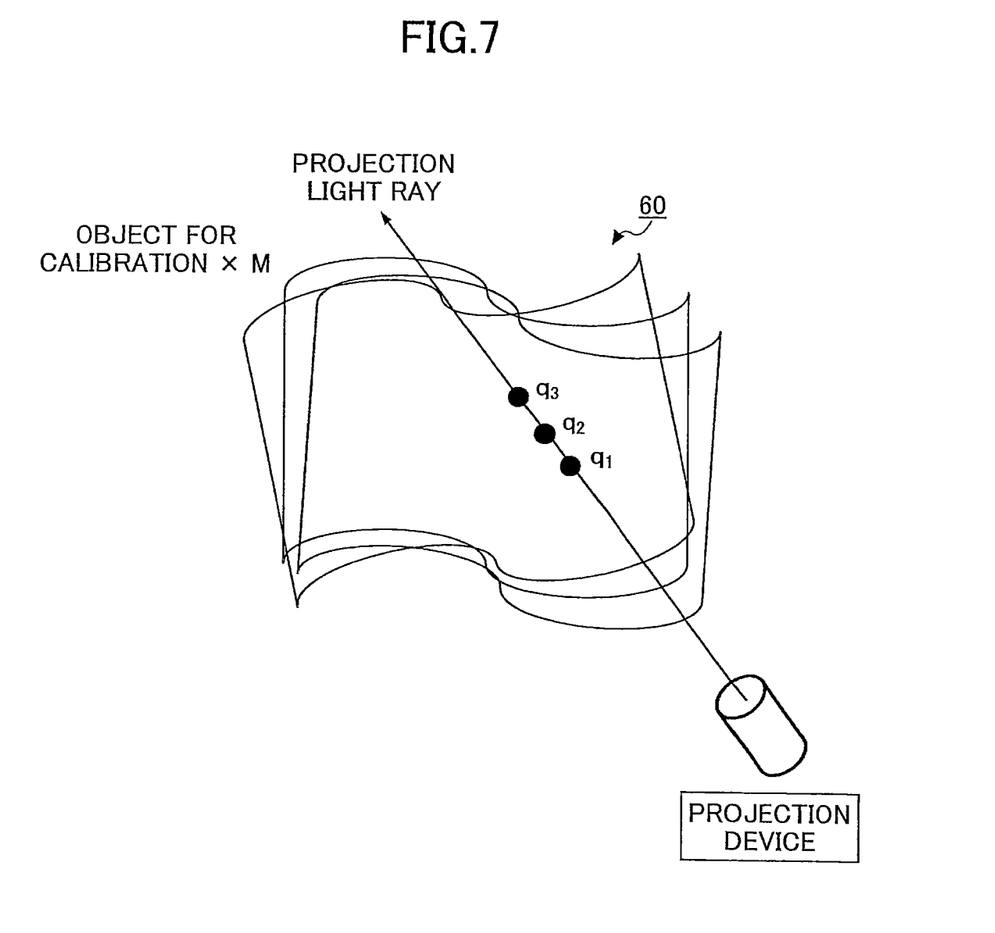
FIG. 7 is a conceptual diagram for illustrating a process executed by a projection light ray identification part in the present embodiment.

Specifically, as illustrated in FIG. 7, a position and a direction of a projection light ray emitted from the projection device 200 are obtained by paying attention to one characteristic point on the pattern for calibration 50, referring to reflection positions q corresponding to an identical characteristic point on the object for calibration 60 (which are different for M positions and/or attitudes) as q1, q2, q3, . . . , qM, and fitting a straight line on a group of these points by a least squares method. The aforementioned procedure is executed for reflection positions q corresponding to all of characteristic points p on the pattern for calibration 50 and a position and a direction of a projection light ray corresponding to each characteristic point p are obtained.

Although a procedure of the reflection position estimation part 16 to estimate a position of a reflection position of a projection light ray corresponding to a characteristic point of the pattern for calibration 50 on the object for calibration 60 in a three-dimensional coordinate system has been described above, it is also possible to use another method as described below other than that described above.

Even when an optical system of the imaging device 200 is a non-pinhole system as a whole, it may be possible for it to be regarded as a pinhole system locally. Thus, in a case where it is possible to apply a certain constraint to projection light rays, it is possible for the projection light ray identification part 18 to identify a position and a direction of a projection light ray in accordance with the following procedure at step 107.

First, a set of reflection positions q of the i-th characteristic point of the pattern for calibration 50 on the object for calibration 60, q1(i), q2(i), . . . , qM(i), as estimated by the reflection position estimation part 16 is acquired. Herein, a direction cosine (a unit vector in a direction) and a passage position of a projection light ray corresponding to the i-th characteristic point of the pattern for calibration 50 are referred to as e(i) and a(i).

In a case where it is possible to apply a pinhole camera model to projection light rays corresponding to the i-th characteristic point and the j-th characteristic point, a(i)=a(j) is held. By utilizing this fact, a problem of optimization indicated by the following formula (3):

$$\sum_{i \in S} \sum_{k=1}^{M} \|(I - e(i)e(i)^T)(q_k(i) - a(i))\|^2 \qquad (3)$$

being minimized subject to $$a(i) = a(j) \ (i, j \in S)$$

is solved wherein a set of indices of projection light rays for which an identical pinhole camera model is held is referred to as S.

That is, while passage positions of projection light rays are constrained to be one point, a sum of squares of a distance from a straight line of a projection light ray to an estimated position of a reflection position is minimized. It is possible to solve this problem of optimization by a repetitive operation as follows.

First, an initial value is set at e(i) (i∈S). For example, a principal component analysis is applied to q1(i), q2(i), . . . qM(i) and a direction of a first principal component is set at e(i). Then, a=a(i) (i∈S) is obtained in accordance with the following formula (4):

$$a \leftarrow \left( \sum_{i \in S} W(i) \right)^{-1} \sum_{i \in S} \left( \frac{W(i)}{M} \sum_{k=0}^{M} q_k(i) \right) \qquad (4)$$

$$W(i) = I - e(i)e(i)^T$$

Then, an eigen vector is obtained that corresponds to a maximum eigen value of a next matrix for i∈S, and it is assigned to e(i).

Updating of a passage position a in the aforementioned formula (4) and updating of a direction cosine e(i) in an eigen value operation in the following formula (5):

$$\sum_{k=1}^{M} (q_k(i) - a)(q_k(i) - a)^T \qquad (5)$$

are repeated until a specified condition(s) is/are satisfied.

According to a method for executing a least squares estimation based on a constraint held on projection light rays as described above, it is possible to identify a position and a direction of a projection light ray from a few imaged images robustly. In this method, it is possible to set, for example, repeating certain times, an amount of a change in a parameter for each repetition being less than a certain threshold value, or the like, as a specified condition(s). Furthermore, a constraint to be provided is not limited to the aforementioned example, and it is also possible to provide, for example, a symmetry of a projection light ray with respect to an optical axis, as a constraint. Because it is not possible to apply a repetitive solution as described above in a case of a general constraint, a solution is obtained by a generalized nonlinear optimization method with a constraint(s).

Moreover, even when it is not possible to apply to a certain constraint to projection light rays, positions and directions of projection light rays that are spatially adjacent may be similar values in an optical system with a sufficiently smooth change. In such a case, it is possible for the projection light ray identification part 18 to identify a position and a direction of a projection light ray in accordance with the following procedure at step 107.

First, an estimated value of a projection position of the pattern for calibration 50 is acquired that is estimated by the reflection position estimation part 16. For the pattern for calibration 50, characteristic points arranged in a tetragonal lattice shape such as a checker pattern are used, wherein an estimated value of a reflection position of a characteristic point at the i-th row and the j-th column in the k-th imaged image, a direction cosine (unit vector in a direction) of a projection light ray corresponding to a characteristic point at the i-th row and the j-th column, and a passage position are denoted as qk(i,j), e(i,j), and a(i,j). By using this, an evaluation function indicated by the following formula (6):

$$J(e, a) = \sum_{i} \sum_{j} \sum_{k=1}^{M} \|(I - e(i,j)e(i,j)^T)(q_k(i,j) - a(i,j))\|^2 + \Phi(e, a) \qquad (6)$$

is prepared.

A first term is a sum of squares of a distance from a straight line of a projection light ray to an estimated position of a reflection position and a second term $\Phi(e,a)$ is a regularization term. It is possible to provide a penalty to smoothness of a direction cosine or a passage position of a projection light ray. For example, it is possible to set a sum of squares of a second order difference of a direction cosine e(i,j) in an i-direction like the following formula (7):

$$\Phi(e, a) = \sum_i \sum_j \|e(i-1, j) - 2e(i, j) + e(i+1, j)\|^2 \quad (7)$$

It is also possible to consider a j-direction similarly, and it is also possible to set a similar regularization term for a passage position a(i,j). e(i,j) and a(i,j) are obtained by using thus prepared regularization term Φ(e,a) so as to minimize the aforementioned formula (6), and thereby, it is possible to obtain a projection light ray with a direction and position that are spatially smoothly changed.

Here, for minimization of the aforementioned formula (6), it is possible to use a non-linear optimization method such as a steepest descent method or a Newton's method.

As described above, it is possible to identify a position and a direction of a projection light ray from a few imaged images robustly by minimizing a distance from a straight line to an estimated value of a reflection position of each projection light ray and an amount of a change in a position and a direction of each projection light ray.

As the projection light ray identification part 18 identifies a position and a direction of a projected light ray in accordance with any procedure described above, the process goes to step 108.

At step 108, the projection light ray correction part 19 corrects a position and a direction of a projection light ray that are identified by the projection light ray identification part 18. For a method of correction, it is possible to utilize a filtering process. Herein, similarly to the aforementioned third embodiment, characteristic points are arranged in a tetragonal lattice shape, and a direction cosine e(i,j) and a passage position a(i,j) of a projection light ray corresponding to a characteristic point at the i-th row and the j-th column have been obtained.

Figure 8:
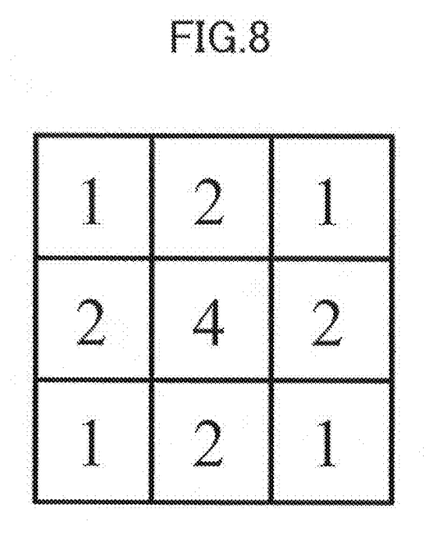
FIG. 8 is a diagram for illustrating a filter used by a projection light ray correction part in the present embodiment.

For this matter, it is possible to execute smoothing so as to reduce an error by applying, for example, a filter with coefficients illustrated in FIG. 8. A filter to be applied is not limited to a linear filter, and for example, it is possible to hold a steep change and execute smoothing by applying a non-linear filter such as a median filer, an ε-filter, or bilateral filter.

In accordance with the procedure described above, a position and a direction (an equation of a straight line in a three-dimensional space) of a projection light ray (straight line) are acquired as parameters for each picture element corresponding to a characteristic point of the pattern for calibration 50 and stored in appropriate storage means (for example, the storage part 13).

In a three-dimensional measurement after calibration, a measurement is conducted by using the aforementioned pattern for calibration 50 as a pattern for measurement 50. Specifically, the pattern for measurement 50 is projected from the projection device 200 onto an object with an unknown shape and this is imaged by the imaging device 300. Herein, a point of intersection between a first straight line represented by an equation of a projection light ray relating to a picture element corresponding to a characteristic point of the pattern for measurement 50 and a second straight line (imaged light ray) passing through an imaging center and a position of an imaged picture element of the imaging device 300 that corresponds to the characteristic point is obtained as a three-dimensional position of an object with an unknown shape (a projected image corresponding to the aforementioned characteristic point of the pattern) (in a case where the two straight lines do not intersect, a point of intersection is estimated by a midpoint method).

Here, a coefficient of an equation of a projection light ray relating to a picture element corresponding to a characteristic point of the pattern for calibration 50 may be linearly interpolated or the like to estimate an equation of a projection light ray relating to another picture element (an element other than the picture element to the characteristic point of the pattern for calibration 50) and use this as a parameter. Thus, if equations of projection light rays relating to all the picture elements on a projection coordinate system are obtained as parameters, it is possible to conduct a three-dimensional measurement that uses an arbitrary pattern other than a projection pattern used for calibration.

Figure 9:
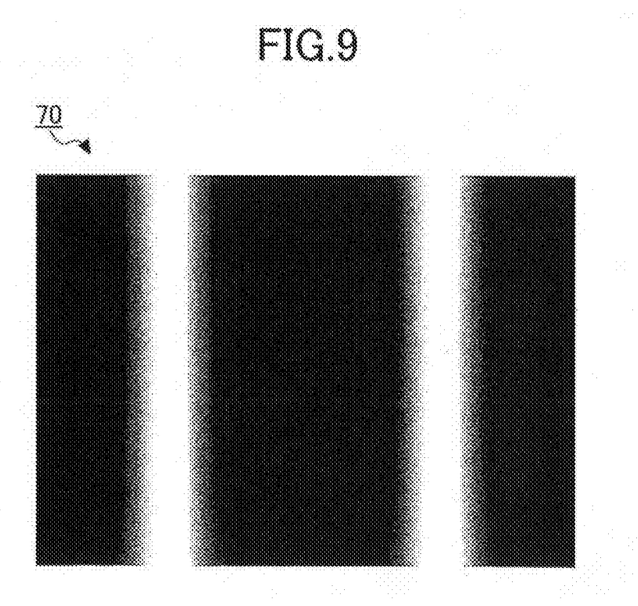
FIG. 9 is a diagram for illustrating a pattern for calibration in the present embodiment.

Moreover, if a pattern 70 with a contrast that changes in a sine wave form, as illustrates in FIG. 9, is used as a pattern for calibration, it is possible to obtain equations of projection light rays relating to all the picture elements on a projection coordinate system.

Specifically, the pattern 70 is imaged more than once while being shifted from side to side, and a phase of a sine wave is estimated for each picture element of an imaged image. Similarly, the pattern 70 is imaged more than once while being shifted up and down on a condition of being rotated by 90 degrees, and a phase of a sine wave is estimated for each picture element of an imaged image. As a result, it is possible to provide correspondence between all the picture elements that compose the pattern 70 and picture elements of an imaged image (a phase shift method). In this case, if the aforementioned procedure is executed while all the picture elements that compose the pattern 70 are regarded as characteristic points of a pattern for calibration as described above, it is possible to obtain equations of projection light rays relating to all the picture elements on a projection coordinate system as parameters. Then, in this case, similarly, it is also possible to conduct a three-dimensional measurement that uses an arbitrary pattern other than a projection pattern used for calibration.

Although embodiments of the present invention have been described above, the present invention is not limited to the aforementioned embodiments.

First, a drawn pattern that is provided on an object for calibration as a characteristic point and the pattern for calibration 50 that is projected onto the object for calibration are not limited to the aforementioned examples, wherein a checker pattern and a circular pattern may be used for an object for calibration and a pattern for calibration and an identical pattern may be used for an object for calibration and a pattern for calibration. Otherwise, as long as it is possible to specify arrangement of a characteristic point preliminarily, any pattern may be provided such as random dots or a natural image.

Furthermore, it is also possible to use a polyhedral object for calibration instead of providing a characteristic point of an object for calibration as a drawn pattern. In this case, it is possible to use each apex of a polyhedron as a characteristic point instead of a drawn pattern.

Otherwise, a scope of embodiments that could be supposed by a person skilled in the art is included in the scope of the present invention as long as an action and an effect of the present invention are provided.

It is possible to realize each function of the aforementioned embodiments by a program that is written in C, C++, C#, Java (registered trademark), or the like and is capable of being executed by a device, and it is possible for a program in the present embodiment to be stored in and distributed by a recording medium that is capable of being read by a device, such as a hard disk device, a CD-ROM, an MO, a DVD, a flexible disk, an EEPROM, or an EPROM, and further, it is possible for the program to be transmitted through a network in a form feasible for use by another device.

[Appendix]

<An Illustrative Embodiment(s) of a Calibration Device, a Method, and a Program>

At least one illustrative embodiment of the present invention may relate to at least one of a calibration device, a method, and a program.

An object of at least one illustrative embodiment of the present invention may be to provide a device, method, and program for calibrating a three-dimensional measurement device that uses a projection device that has an optical system differing from a pinhole camera model.

As a configuration for calibrating a three-dimensional measurement device that uses a projection device that has an optical system differing from a pinhole camera model, at least one illustrative embodiment of the present invention may be a calibration device that includes pattern-for-calibration projection means for controlling a projection device to project a pattern for calibration onto a three-dimensional object for calibration that has a plurality of characteristic points, object-for-calibration imaging means for controlling an imaging device to acquire a plurality of imaged images wherein the three-dimensional object with the pattern for calibration projected thereon is imaged from a plurality of imaging directions, position attitude estimation means for estimating a relative position and attitude of the imaging means with respect to the three-dimensional object based on positions of the characteristic points of the three-dimensional object on the plurality of imaged images, reflection position estimation means for estimating reflection positions of projection light rays corresponding to characteristic points of the pattern for calibration on the three-dimensional object based on positions of the characteristic points of the pattern for calibration and the relative position and attitude of the imaging means being estimated, for each imaged image, and projection light ray identification means for identifying positions and directions of the projection light rays corresponding to the characteristic points of the pattern for calibration based on a plurality of the reflection positions estimated for the plurality of imaged images.

Illustrative Embodiment (1) is a calibration device that includes pattern-for-calibration projection means for controlling a projection device to project a pattern for calibration onto a three-dimensional object for calibration that has a plurality of characteristic points, object-for-calibration imaging means for controlling an imaging device to acquire a plurality of imaged images wherein the three-dimensional object with the pattern for calibration projected thereon is imaged from a plurality of imaging directions, position attitude estimation means for estimating a relative position and attitude of the imaging means with respect to the three-dimensional object based on positions of the characteristic points of the three-dimensional object on the plurality of imaged images, reflection position estimation means for estimating reflection positions of projection light rays corresponding to characteristic points of the pattern for calibration on the three-dimensional object based on positions of the characteristic points of the pattern for calibration and the relative position and attitude of the imaging means being estimated, for each imaged image, and projection light ray identification means for identifying positions and directions of the projection light rays corresponding to the characteristic points of the pattern for calibration based on a plurality of the reflection positions estimated for the plurality of imaged images.

Illustrative Embodiment (2) is the calibration device as described in Illustrative Embodiment (1), wherein the projection light ray identification means fit a straight line on the plurality of the reflection positions being estimated, by a least squares method, to identify the positions and directions of the projection light rays.

Illustrative Embodiment (3) is the calibration device as described in Illustrative Embodiment (1), wherein the projection light ray identification means minimize a distance of the reflection position of each projection light ray from a straight line under a constraint applied to the projection light rays to identify the positions and directions of the projection light rays.

Illustrative Embodiment (4) is the calibration device as described in Illustrative Embodiment (1), wherein the projection light ray identification means minimize a distance of the reflection position of each projection light ray from a straight line and amounts of changes in the position and direction of each projection light ray to identify the positions and directions of the projection light rays.

Illustrative embodiment (5) is the calibration device as described in any of Illustrative Embodiments (1) to (4), further including projection light ray correction means for applying a filtering process to the position and direction of each projection light ray.

Illustrative Embodiment (6) is a calibration method that includes a step for controlling a projection device to project a pattern for calibration onto a three-dimensional object for calibration that has a plurality of characteristic points, a step for controlling an imaging device to acquire a plurality of imaged images wherein the three-dimensional object with the pattern for calibration projected thereon is imaged from a plurality of imaging directions, a step for estimating a relative position and attitude of the imaging means with respect to the three-dimensional object based on positions of the characteristic points of the three-dimensional object on the plurality of imaged images, a step for estimating reflection positions of projection light rays corresponding to characteristic points of the pattern for calibration on the three-dimensional object based on positions of the characteristic points of the pattern for calibration and the relative position and attitude of the imaging means being estimated, for each imaged image, and a step for identifying positions and directions of the projection light rays corresponding to the characteristic points of the pattern for calibration based on a plurality of the reflection positions estimated for the plurality of imaged images.

Illustrative Embodiment (7) is the calibration method as described in Illustrative Embodiment (6), wherein the step for identifying positions and directions of the projection light rays includes a step for fitting a straight line on the plurality of the reflection positions being estimated, by a least squares method, to identify the positions and directions of the projection light rays.

Illustrative Embodiment (8) is the calibration method as described in Illustrative Embodiment (6), wherein the step for identifying positions and directions of the projection light rays includes a step for minimizing a distance of the reflection position of each projection light ray from a straight line under a constraint applied to the projection light rays to identify the positions and directions of the projection light rays.

Illustrative Embodiment (9) is the calibration method as described in Illustrative Embodiment (6), wherein the step for identifying positions and directions of the projection light rays includes a step for minimizing a distance of the reflection position of each projection light ray from a straight line and amounts of changes in the position and direction of each projection light ray to identify the positions and directions of the projection light rays.

Illustrative embodiment (10) is a computer-executable program for causing a computer to execute each step in the method as described in any of Illustrative Embodiments (6) to (9).

According to at least one illustrative embodiment of the present invention, it may be possible to provide a device, method, and program for calibrating a three-dimensional measurement device that uses a projection device that has an optical system differing from a pinhole camera model.

Although the illustrative embodiment(s) and specific example(s) of the present invention have been described with reference to the accompanying drawing(s), the present invention is not limited to any of the illustrative embodiment(s) and specific example(s), and the illustrative embodiment(s) and specific example(s) may be altered, modified, or combined without departing from the scope of the present invention.

The present application is based on and claims the benefit of priority to Japanese Patent Application No. 2013-053551 filed on Mar. 15, 2013, the entire content of which is herein incorporated by reference.

What is claimed is:

1. A calibration device, comprising:
   circuitry configured to
      control a projection device to project a pattern for calibration onto a three-dimensional object for calibration that has a plurality of characteristic points,
      control an imaging device to acquire a plurality of images, wherein the three-dimensional object with the pattern for calibration projected thereon is imaged by the imaging device from a plurality of imaging directions by changing positions of the imaging device relative to the three-dimensional object while the three-dimensional object remains fixed, the changing of positions of the imaging device being performed in response to a determination whether a predetermined number of images have already been acquired,
      estimate a relative position and attitude of the imaging device with respect to the three-dimensional object based on positions of the characteristic points of the three-dimensional object on the plurality of images,
      estimate reflection positions of projection light rays corresponding to characteristic points of the pattern for calibration on the three-dimensional object based on positions of the characteristic points of the pattern for calibration and the relative position and attitude of the imaging device being estimated, for each image, and
      identify positions and directions of the projection light rays corresponding to the characteristic points of the pattern for calibration based on a plurality of the reflection positions estimated for the plurality of images.

2. The calibration device as claimed in claim 1, wherein the circuitry is configured to fit a straight line on the plurality of the reflection positions being estimated, by a least squares method, to identify the positions and directions of the projection light rays.

3. The calibration device as claimed in claim 1, wherein the circuitry is configured to minimize a distance of the reflection position of each projection light ray from a straight line under a constraint applied to the projection light rays to identify the positions and directions of the projection light rays.

4. The calibration device as claimed in claim 1, wherein the circuitry is configured to minimize a distance of the reflection position of each projection light ray from a straight line and amounts of changes in the position and direction of each projection light ray to identify the positions and directions of the projection light rays.

5. The calibration device as claimed in claim 1, wherein the circuitry is configured to apply a filtering process to the position and direction of each projection light ray.

6. A calibration method, comprising:
   controlling a projection device to project a pattern for calibration onto a three-dimensional object for calibration that has a plurality of characteristic points;
   controlling an imaging device to acquire a plurality of images, wherein the three-dimensional object with the pattern for calibration projected thereon is imaged by the imaging device from a plurality of imaging directions by changing positions of the imaging device relative to the three-dimensional object while the three-dimensional object remains fixed, the changing of positions of the imaging device being performed in response to a determination whether a predetermined number of images have already been acquired;
   estimating a relative position and attitude of the imaging device with respect to the three-dimensional object based on positions of the characteristic points of the three-dimensional object on the plurality of images;
   estimating reflection positions of projection light rays corresponding to characteristic points of the pattern for calibration on the three-dimensional object based on positions of the characteristic points of the pattern for calibration and the relative position and attitude of the imaging device being estimated, for each image; and
   identifying positions and directions of the projection light rays corresponding to the characteristic points of the pattern for calibration based on a plurality of the reflection positions estimated for the plurality of images.

7. The calibration method as claimed in claim 6, wherein the identifying of positions and directions of the projection light rays includes fitting a straight line on the plurality of the reflection positions being estimated, by a least squares method, to identify the positions and directions of the projection light rays.

8. The calibration method as claimed in claim 6, wherein the identifying of positions and directions of the projection light rays includes minimizing a distance of the reflection position of each projection light ray from a straight line under a constraint applied to the projection light rays to identify the positions and directions of the projection light rays.

9. The calibration method as claimed in claim 6, wherein the identifying of positions and directions of the projection light rays includes minimizing a distance of the reflection position of each projection light ray from a straight line and amounts of changes in the position and direction of each projection light ray to identify the positions and directions of the projection light rays.

10. A non-transitory computer-readable recording medium storing a computer program configured to cause a computer to execute the calibration method as claimed in claim 6.

11. The calibration method as claimed in claim 6, further comprising:
 applying a linear filter to the position and direction of each projection light ray.

12. The calibration method as claimed in claim 6, further comprising:
 applying a median filter to the position and direction of each projection light ray.

* * * * *